March 3, 1953  W. F. KLEMM  2,630,039
EXPANSION ARBOR
Filed Sept. 3, 1946  2 SHEETS—SHEET 1
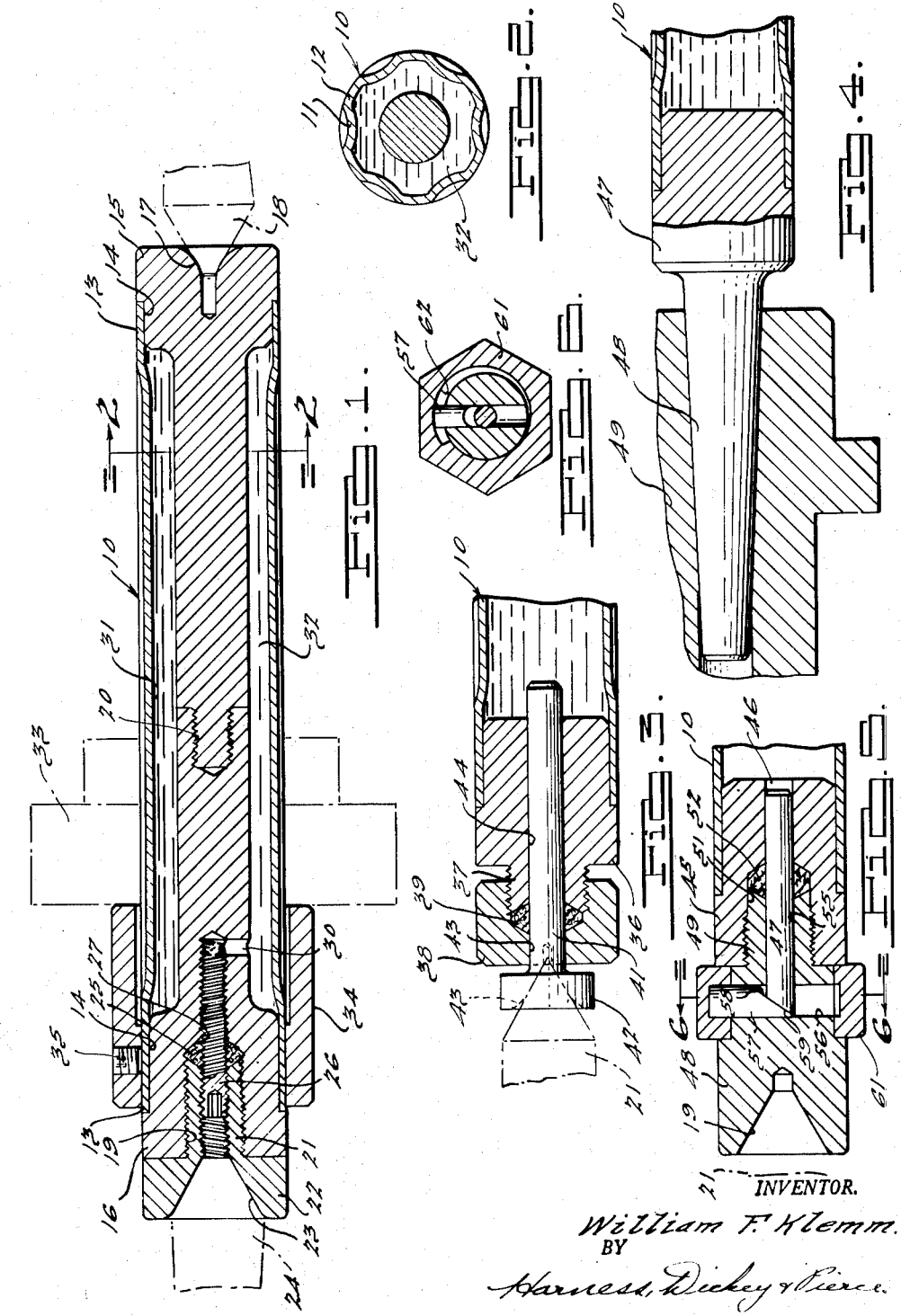
INVENTOR.
William F. Klemm.
BY
Harness, Dickey & Pierce
ATTORNEYS.

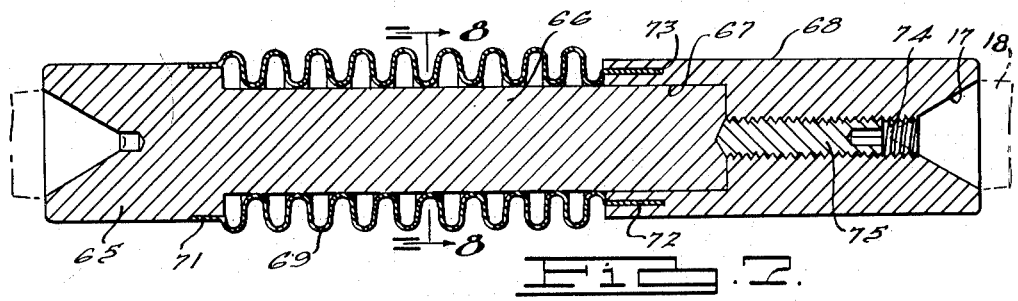
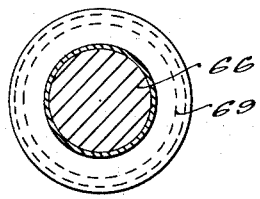
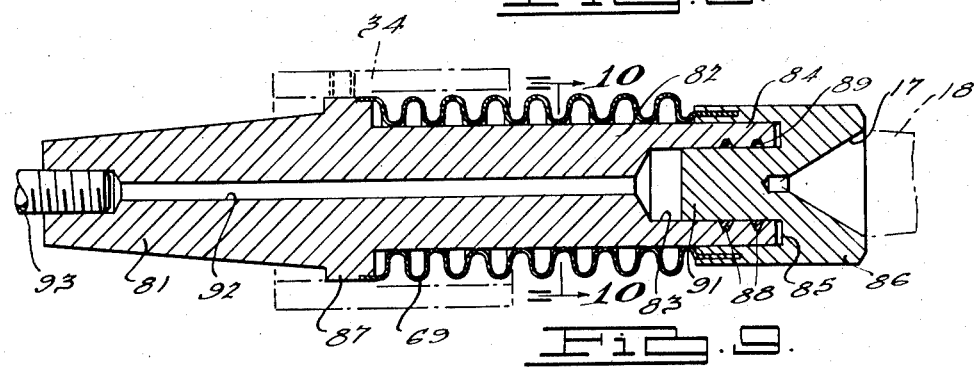
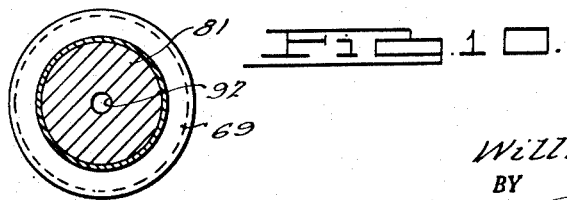

Patented Mar. 3, 1953

2,630,039

UNITED STATES PATENT OFFICE 2,630,039

EXPANSION ARBOR

William F. Klemm, Detroit, Mich.

Application September 3, 1946, Serial No. 694,653

5 Claims. (Cl. 82—44)

This invention relates to expansion arbors and particularly to an arbor having a hollow body filled with a substance which transfers pressure to produce uniform expansion of the body.

The arbor of the present invention embodies a corrugated type of tube having end plugs sealed thereto and provided on the interior with oil, rubber pellets, or other substance by which a uniform outward pressure is produced for expanding the tube wall. Countersunk centers are provided in the ends of the plugs so that the arbor may be supported between a pair of centers of a machine. One of the heads is provided with means for applying a pressure to the material contained within the hollow interior of the arbor for producing a uniformly distributed force for expanding the body thereof. The pressure applying means may be disposed in extension of the countersunk bore, or may project laterally thereof, or may be a plunger which is actuated by the centers when being advanced toward each other to support the arbor. A tapered shank may be provided on one of the plugs in place of the center so that the arbor may be retained on a mandrel having a tapered aperture. A sleeve may be secured at a predetermined point on the arbor for the purpose of locating the workpiece to have it accurately positioned relative to the tool which is to operate thereon.

Accordingly, the main objects of the invention are: to provide an expansible arbor having a thin corrugated-like wall containing a pressure transferring substance by which the arbor is expanded and contracted; to provide an arbor made from a corrugated type of tube sealed at each end by a plug containing a countersunk center by which the arbor is supported, having a substantially noncompressible material therein on which a pressure applying element operates to produce the expansion and contraction of the tube portion; to provide on the axis of a hollow arbor containing a pressure transferring medium a means for applying a pressure to the medium for procuring the expansion of the arbor either directly by the use of a tool or by the pressure exerted by centers on which the arbor is supported; and, in general, to provide an arbor which is simple in construction, uniform in expansion and economical of manufacture.

Other objects and features of novelty of the invention will be specifically pointed out or will become apparent when referring, for a better understanding of the invention, to the following description taken in conjunction with the accompanying drawings, wherein:

Figure 1 is a sectional view of an expansion arbor embodying features of this invention;

Fig. 2 is a sectional view of the structure illustrated in Fig. 1, taken on the line 2—2 thereof;

Fig. 3 is a view of structure, similar to that illustrated in Fig. 1, showing a different form of the invention;

Fig. 4 is a view of structure, similar to that illustrated in Fig. 3, showing a further form which the invention may assume;

Fig. 5 is a sectional view of structure, similar to that illustrated in Fig. 3, showing a further form of the invention;

Fig. 6 is a sectional view of the structure illustrated in Fig. 5, taken on the line 6—6 thereof;

Fig. 7 is a sectional view of structure, similar to that illustrated in Fig. 1, showing a still further form which the invention may assume;

Fig. 8 is a sectional view of the structure illustrated in Fig. 7, taken on the line 8—8 thereof;

Fig. 9 is a view of structure similar to that illustrated in Fig. 7, showing a further form of the invention, and Fig. 10 is a sectional view of the structure illustrated in Fig. 9, taken on the line 10—10 thereof.

Referring to Figs. 1 and 2, the expansion arbor therein illustrated comprises a tubular central portion 10 having offset portions 11 inwardly of the ends to be disposed between portions 12 having arcuate surfaces which, if joined, would form a true cylinder. The cylindrical ends 13 extend over shouldered ends 14 of end plugs 15 and 16 which are connected together in unit relation by the threaded connection 20. The end plug 15 is provided with a countersunk center 17 for receiving a center 18 of a machine on which the arbor is supported. The ends 13 of the tubular element 10 are soldered, welded, brazed or otherwise sealed to the connected plugs 15 and 16. The plug 16 has an enlarged threaded aperture 19 for receiving a threaded projection 21 on a head 22 having a countersunk center 23 therein for receiving the center 24 of the machine for supporting the arbor between the two centers.

The threaded projection 21 of the head 22 compresses a packing material 25 in the bottom of the aperture 19. A screw 26 is threaded in an aperture 27 at the inner end of the plug and may or may not be threaded to the aperture in the center of the threaded projection 21. The screw 26 in the aperture 27 is sealed against the passage of liquid or other substance by the packing material 25 but has its end in contact therewith through the plurality of passageways 30.

The screw 26 is adjusted inwardly to apply pressure to the material 32 which distributes the pressure uniformly in all directions to exert a uniform radial force on the tube 10 to cause the arcuate portions 12 thereof to expand radially equal amounts outwardly of the arbor axis. This radial expansion produces the clamping of a workpiece, such as the workpiece 33 shown in broken lines, to the arbor so that when the arbor is mounted between the centers 18 and 21 the workpiece will be fixed thereto. The unit relation of the end plugs 15 and 16 provided by the threaded connection 20 prevents any end force from being applied to the tubular portion 10 of the arbor. After the operation has been completed upon the workpiece, the withdrawal of the screw 26 from the interior 31 of the arbor will remove the pressure on the substance 32 to permit the arcuate portions 12 thereof to collapse, thereby to release the workpiece 33 and permit a new workpiece to be placed thereon.

A cylindrical shouldering element 34 is illustrated as being fixed to the arbor by a screw 35 for the purpose of accurately positioning the workpiece 33 thereon relative to a tool which is to operate thereon. The workpiece is slid over the end of the arbor having the plug 15 therein until it rests against the shouldering element 34, after which the screw 26 is adjusted inwardly to expand the arbor into engagement with the workpiece so that it is accurately positioned relative to the tool when supported in the centers 18 and 21.

Referring to Fig. 3, a further form of the invention is illustrated, that wherein a plug 36 is secured to the end of the tube 10 in place of the plug 16. The plug 36 has a threaded projecting end 37 on which a nut 38 is screwed to form a packing gland when compressing the packing material 39 about a stem 41. The stem 41 is provided with a head 42, having a recessed center 43 therein in position to be engaged by the center 21. The stem extends through an aperture 44 in the plug 36 and through an aperture 45 in the nut 38. The inner end of the stem 41 is illustrated as being projected within the hollow interior 31 of the arbor for applying a pressure to the material 32 contained therein for expanding the arcuate portions 12 thereof. The projection of the stem 41 is produced by the pressure applied between the two centers 18 and 21 as they are moved toward each other to support the arbor. Upon separating the centers 18 and 19, the pressure on material 32 is released and the tension in the tubular element 10 produces the retraction of the stem 41 and the collapse of the arbor to release the workpiece.

In Fig. 4 a further form of the invention is illustrated, that wherein the plug 15 has a plug 47 substituted therefor. The plug 47 has a tapered shank 48 of conventional form which registers in the tapered recess of a mandrel 49. In this arrangement the arbor is at all times supported in the machine so that it is only necessary to operate a screw 26 or stem 41 to expand and contract the central tubular portion of the arbor to clamp or release the workpiece. It is to be understood that the expanding means need not be disposed on the axis of the arbor but may be positioned in any manner to be movable into and out of the hollow interior 31 for applying and removing a pressure to and from the material 32 contained therein. It is also to be understood that the shouldering element 34 may also be employed on other types of tools such as those illustrated in Figs. 3 and 4 and that the particular tools herein illustrated are shown more as a way of example instead of having the tool limited to the specific embodiments illustrated. The tube itself could be corrugated in different manners from that herein illustrated while permitting the expansion and contraction thereof.

In case the material of the tubular expanding part of the arbor varies in thickness and the degree of resiliency so that when equal pressures are applied thereon some portions may expand more readily than others, this condition can be corrected in the following manner. In case an arbor is to be constructed for a workpiece having an aperture of predetermined diameter, the tubular portion thereof may be expanded to a position slightly beyond the diameter and mounted on the centers of the grinding machine which accurately grinds the tubular portion to the diameter of the workpiece. Thereafter, when the pressure is removed from the material 32 on the interior of the arbor, the arbor will collapse so that the workpiece may be placed thereover, and when the arbor is again expanded, assurance is had that the expanded diameter will accurately locate the center of the workpiece on the center of the countersunk centers 17 and 19 of the arbor.

Referring to Fig. 5, the form of the invention therein illustrated comprises an expansible tube 10 having a plug 15 in one end thereof and a plug 45 disposed in the opposite end thereof. The plug 45 contains an aperture 46 in which a plunger 47 is longitudinally movable. A head 48 has a threaded projection 49 which threads into an aperture 51 in the end of the plug 45 in aligned relation with the aperture 46. The threaded projection 49 on the head 48 forms with the aperture in the plug 45 a packing gland for compressing the packing material 52 about the plunger 47. The projection 49 is provided with an aperture 55 through which the plunger 47 extends into an aperture 56 disposed at right angles to and intersecting the aperture 55. A plunger 57 is disposed within the aperture 56 having a sloping face 58 matable with a sloping face 59 on the end of the plunger 47. A manually adjustable collar 61 is mounted on the head 48 for movement in rotation thereon. Within the collar 61, a cam slot 62 is provided, engageable with the end of the plunger 57 opposite to that having the sloping face 58.

By rotating the adjustable collar 61, the plunger 47 is moved toward or away from the plunger 47 and, due to the sloping relationships of the faces 58 and 59 thereof, the plunger 47 is moved longitudinally to the right, as viewed in the figure, for applying pressure on the material within the tube 10 for expanding the tube. When the adjustable collar 61 is rotated in the opposite direction, the pressure on the material within the tube 10 produces the retraction of the plungers 47 and 57 to the degree permitted by the amount of reverse rotation of the adjustable collar 61. The adjustable collar 61 is herein illustrated as being hexagonal in shape so that a standard type of tool may be employed for applying substantial pressure to the material within the tube for procuring its expansion. It is to be understood that other forms or special types of tools may be utilized for applying the pressure to the collar and the material.

Referring to Figs. 7 and 8, the expanding arbor therein illustrated embodies an end plug 65 having a body portion 66 of reduced diameter extending therefrom for projecting within an aperture 67 of an end plug 68. A sinuous tubular spring element 69 of the shape of a Sylphon has one cylindrical projecting end 71 brazed or otherwise secured to the plug 65 while the cylindrical projection 72 on the opposite end extending within a slot 73 in the end of the plug 68 is rigidly secured by brazing or other suitable process. The plug 68 is provided with a threaded aperture 74 in which a threaded screw 75 is disposed having the end in engagement with the end of the body portion 66 on the plug 65. By adjusting the screw 75 within the threaded aperture 74, the plug 68 is moved relative to the plug 65 to thereby stretch the spring element 69 and reduce its diameter. A workpiece may then be inserted over the spring element, after which the screw 75 is retracted to permit the plugs 68 and 65 to move toward each other and the spring element 69 to expand into engagement with the wall of the bore of the workpiece disposed thereover. A substantial radial force is produced by the spring element 69 on the internal wall of the bore of the workpiece which securely retains the workpiece in fixed relation to the arbor against rotation relative thereto.

Referring to Figs. 9 and 10, a still further form of the invention is illustrated, that wherein a shank portion 81 of a tool has a reduced end portion 82 containing a central aperture 83 forming a wall portion 84 which projects within an annular slot 85 in an end plug 86. The shank portion 81 is provided with a shoulder 87 to which one end of the spring element 69 is secured, the opposite end being secured to the plug 86 in a manner similar to that illustrated in Figs. 7 and 8. Notches 88 are provided on the inner wall of the aperture 83 in which sealing rings 89 are disposed in position to form a seal with the wall of the central portion 91 of the plug 86, which functions as a piston within the aperture 83.

A passageway 92 extends through the shank 81 and at its reduced end portion 82 is in communication with a conduit 93 which is threaded or otherwise secured to the end of the shank 81. The shank is supported in an arbor in the usual manner while a plug 86 has a countersunk center supported on a center 18 after the workpiece is secured on the arbor. When a fluid is introduced into the passageway 92 and the aperture 83, the plug 86 is moved outwardly on the reduced end portion 82 of the shank 81 and the spring element 69 is elongated and contracted. A workpiece may be inserted over the contracted arbor and the fluid pressure on the plug 86 is released, permitting the contraction of the spring 69 and its radial expansion into engagement with the wall of the bore of the workpiece. Thereafter the center 18 is advanced into engagement with the countersunk center 17 of the plug.

The element 34, illustrated in Fig. 1, may be applied to the shoulder 87 of the shank 81 for positioning the workpiece, in the same manner as described with relation to the structure of Fig. 1. It is to be understood that the shouldering element 34 may be applied to any of the tools herein illustrated and described.

From the foregoing description, it will be apparent that an arbor has been provided which is readily expanded by the slight adjustment of an element to engage a workpiece with a substantial pressure and to accurately locate the workpiece on the center of the arbor. The workpiece may be accurately positioned along the length of the arbor by a locating shoulder which is attachable thereto. While various means of applying a pressure to the material within the hollow interior of the arbor are illustrated, it is to be understood that the invention contemplates the use of means, other than those shown, located in any convenient manner while being capable of adjustment into and out of the hollow interior of the arbor for producing its expansion and retraction.

What is claimed is:

1. An arbor for supporting a workpiece including, in combination, an annular corrugated tube forming a spring element, a plug secured to each end of said spring element and interengaging each other within the tube in piston and cylinder relation, one of said plugs having a passageway leading to said cylinder for conducting a fluid under pressure thereto for contracting said spring element which expands to engage a workpiece when the pressure is relieved.

2. An arbor for supporting a workpiece including, in combination, a tubular element having cylinder end portions and a central corrugated portion spacing the end portions a predetermined distance apart in the normal position of the corrugated portion and which permits the end portions to be moved apart, plugs disposed in telescoped relation within the element and secured in the cylindrical ends thereof in sealed relation thereto and provided with means by which the arbor is supported with the workpiece in machinable position, and means for moving said plugs away from each other to decrease the diameter of the corrugated portion of said tubular element.

3. An arbor for supporting a workpiece including, in combination, an annular corrugated tube which is extensible longitudinally of its length, means for sealing each end of the tube and disposed in engagement with each other within said tube, and means applied between said sealing means within the tube for relatively moving said sealing means apart while maintained in engagement for lengthening the tube and reducing the diameter thereof.

4. An arbor for supporting a workpiece including, in combination, an annular corrugated tube forming a springlike element when unstressed, a plug secured to each end of said springlike element and disposed in engagement with each other within said tube, and means relatively moving said plugs axially of said tube for lengthening said springlike element and reducing its diameter while maintaining the plugs and element in axial alignment.

5. An arbor for supporting a workpiece including, in combination, an annular corrugated thin-walled tube forming a springlike element when unstressed, a plug secured to each end of said springlike element and disposed in telescoped slidable engagement with each other therewithin, and means for relatively moving said plugs axially of said element while in engagement with each other for lengthening said element and reducing its diameter.

WILLIAM F. KLEMM.

REFERENCES CITED

The following references are of record in the file of this patent:

UNITED STATES PATENTS

| Number | Name | Date |
| --- | --- | --- |
| 190,579 | Guild | May 8, 1877 |
| 196,867 | Besnard | Nov. 6, 1877 |
| 307,749 | Delano | Nov. 11, 1884 |
| 322,702 | Ehrlich | July 21, 1885 |
| 735,402 | North | Aug. 4, 1903 |
| 1,033,730 | Peacock | July 23, 1912 |
| 1,365,719 | Ogden | Jan. 18, 1921 |
| 1,818,042 | Christman | Aug. 11, 1931 |
| 1,825,925 | Shenk | Oct. 6, 1931 |
| 2,021,259 | Magnuson | Nov. 19, 1935 |
| 2,146,590 | Newell | Feb. 7, 1939 |
| 2,318,838 | Conradson | May 11, 1943 |
| 2,334,954 | Pioch | Nov. 23, 1943 |
| 2,353,248 | Lamb | July 11, 1944 |
| 2,410,493 | Gideon | Nov. 5, 1946 |
| 2,425,928 | Emerson | Aug. 19, 1947 |